Aug. 4, 1931.  R. RÜDENBERG  1,817,526
PROTECTIVE SYSTEM
Filed Nov. 5, 1929

INVENTOR
Reinhold Rüdenberg
BY
*Chesley G. Carr*
ATTORNEY

Patented Aug. 4, 1931

1,817,526

UNITED STATES PATENT OFFICE

REINHOLD RÜDENBERG, OF BERLIN-GRUNEWALD, GERMANY, ASSIGNOR TO WESTINGHOUSE ELECTRIC & MANUFACTURING COMPANY, A CORPORATION OF PENNSYLVANIA

PROTECTIVE SYSTEM

Application filed November 5, 1929, Serial No. 404,968, and in Germany November 9, 1928.

My invention relates to the protection of large power lines in the event of a short-circuit.

Heretofore, it has been customary to provide large switching apparatus of sufficient rating to minimize the disconnect energy. Since present power systems are becoming increasingly larger, it has become more and more difficult to maintain the limit of the disconnect energy at a low value, and, as a result, both the system and its associated apparatus are subject to the harmful effects of short-circuit conditions.

It is well known that short-circuit currents do not generate suddenly but reach a peak value in the first half-cycle and then decrease to a steady-state short circuit value. The peak value of current is often greatly in excess of the value at the steady-state condition, and its value depends upon the part of the current wave at which the short-circuit occurs.

It has long been recognized that such interrupting means should be provided for power lines that the opening of the system would take place in the first half wave after the occurrence of a short-circuit and before the current can reach its peak value. Solution of the mechanical problem of actuating an interrupting means has been developed to a point where quick-acting switches may be made to operate in a few thousandths of a second and less.

In a 60 cycle system, the preferred operating time would be less than 1/120 of a second and, in 50 cycle systems, the time would be less than 1/100 of a second. However, for power lines carrying enormous amounts of energy, it has been impossible to interrupt the circuit until after the first half-cycle or until the steady-state short-circuit condition exists, and the only protection afforded thereby is to limit the duration of the short-circuit current.

An object of my invention, therefore, is to provide a protective relay for a power system which shall minimize the disconnect-energy on the occurrence of a short-circuit.

Another object of my invention is to provide a quick-acting circuit-interrupting means for a power system which shall operate within the first half-wave after the occurrence of a short-circuit.

Another object of my invention is to provide a relay for a power system which shall operate in the event of a short-circuit, when the disconnect-current is substantially the same as the normal current of the system.

Figure 1:
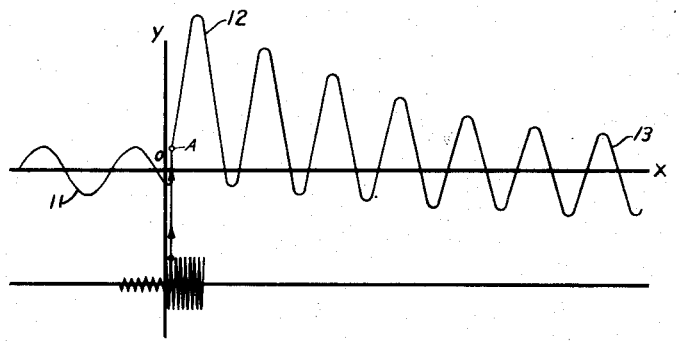
Figure 2:
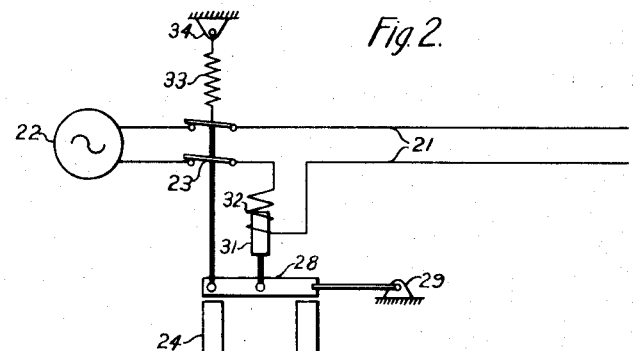
Figure 3:
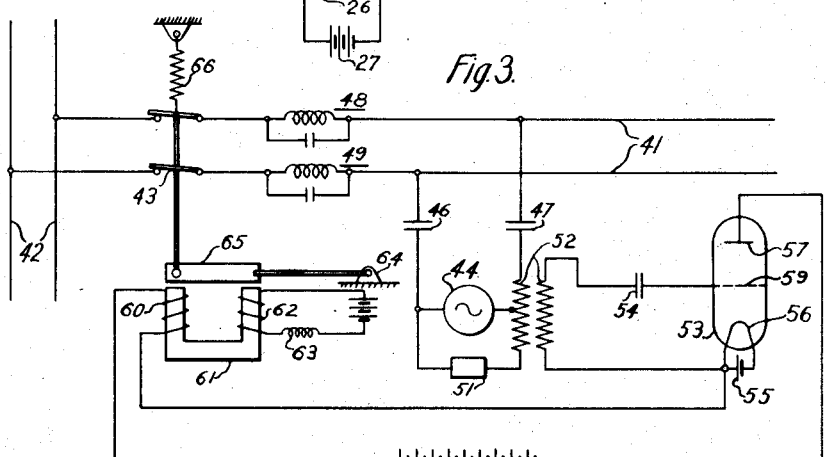

Figure 1 of the drawings is a sine-wave diagram depicting an assumed short-circuit condition;

Fig. 2 is a diagrammatic illustration of an embodiment of my invention having a magnetic relay of a special type; and Fig. 3 is a diagrammatic illustration of a modification of my invention in which superposed high-frequency currents are utilized.

With particular reference to Fig. 1, the upper curve represents an imaginary short-circuit condition obtaining on a power system. The transient nature of the short-circuit current is illustrated by the diagram, where the origin O is taken at the instant of short-circuit; the line OX representing time and the line OY representing current. The portion 11 of the curve represents the normal operating current of the system and if, at any instant, such as represented by the line OY, a short-circuit occurs, the circuit current rises to a peak value 12 and thereafter reduces to a steady-state value 13.

The short-circuit current of a power system is a function of the reactance of the machines connected to the system. In the case of generators connected to the system, there is a decided transient effect of the short-circuit current. This results particularly from the demagnetizing effect of the armature current on the field flux, and, since the flux cannot be changed instantly, because of the damping action of the field windings, the demagnetizing takes place slowly. This causes the short-circuit current to decrease from its high initial value to a steady-state or sustained value after the duration of several half cycles. Since most power systems are subject to frequent short-circuits, and because there is no obvious means for controlling the transient effects of the short-circuit currents, the practical remedy would be to isolate a system before the short-circuit current is allowed to rise to its initial high value.

Fig. 2 shows an alternator 22 supplying a power system 21 through an interrupting means 23. The alternator and system are shown as single-phase, for the purpose of simplification, but it is to be understood that any kind of polyphase apparatus or polyphase system may be utilized, and protection therefor afforded, in accordance with my invention. An electro-magnet 24 is continuously energized by a coil 26 and a source of energy 27; the source of energy 27 being indicated as a constant source, such as a battery, for example. An armature 28, magnetically attracted by said magnet 24, is directly connected to the actuating member of the circuit-interrupting means 23, and said armature is pivotally supported at 29. A solenoid 32, energized in accordance with the current in the system 21, controls a plunger 31 directly connected to the said armature 28. A spring 33, supported as at 34 may be utilized to exert a pull on the circuit-interrupter 23 to tend to open the circuit 21. Under normal operating conditions, the spring 33 is under tension.

The combined pull exerted by the spring 33 and the iron plunger 31 on the armature 28 is normally equalized by the pull of the magnet 24. Thus, in the event of a short-circuit, the current rises in the solenoid 32 and a stronger pull on the iron plunger 31 and its associated armature 28 results, thereby causing the circuit-interrupter 23 to be actuated to the open position thereof.

In order that the pull of the iron plunger 31 on the armature 28 may increase in proportion to the rise of current in the system 21, the occurrance of eddy currents is prevented by the use of a laminated armature. The equilibrium or balance of the spring 33 and plunger 31 against the pull of the magnet 24 may be made so delicate that the circuit interrupter 23 will open its contacts in response to only a slight rise of current, such as is indicated at the point A in Fig. 1.

The above scheme utilizes the rising current itself for actuating the circuit-interrupting means, and the modification shown in Fig. 3 utilizes an auxiliary means whereby the release device for the circuit-interrupting means does not depend upon the action of the short-circuit current. It is at once apparent that, should a device be provided for immediately indicating the presence of short-circuit conditions, and a quick-acting mechanism for opening a circuit-interrupter, in response thereto, be employed, the combination would minimize the number of half-cycle durations of a short-circuit.

For this purpose, I propose the use of superposed high-frequency currents for supervising a power system or associated apparatus. I have assumed, in the foregoing description, that the normal operating frequency would be 60 or 50 cycles but any other frequency may be employed. In the case of a 60 cycle system, the use of superposed high-frequency currents of 60,000 cycles per second would result in the indication of a fault or short-circuit one thousand times more quickly than if the normal frequency had been relied upon for the indication. It may be seen, therefore, that, should superposed high-frequency currents be utilized in conjunction with the scheme above described, the circuit-interrupter could be set into action in 1/1000 of a one-half cycle of the system-operating current. A similar relation exists in the case of a 50 cycle system employing a superposed frequency of 50,000 cycles per second.

Reference may be made again to Fig. 1, where the lower curve represents a superposed high-frequency current before and after a short-circuit condition occurs. In the event of a short-circuit on a power system, supervised by high-frequency currents, both the system-current and the superposed frequency current will increase as shown in Fig. 1; the instant of short circuit being indicated by the line OY. There is no particular relation between the frequency of the normal operating current and that of the superposed current, indicated in this figure, since it is understood that any frequency relation may exist. From the same figure, it is apparent that, after the occurrence of a short-circuit, several cycles of the high-frequency current have been completed before the system current has exceeded its normal operating value. It is possible, therefore, for the system to have been opened before its current has increased appreciably or to such value as is indicated at A.

Referring more specifically to Fig. 3, a power system 41, having a circuit-interrupter 43 therefor, is fed from bus-bars 42. A high-frequency generator 44 furnishes high-frequency oscillations to the system 41 through the blocking condensers 46 and 47. Blocking circuits 48 and 49, each comprising inductive and capacitative impedances placed between the system 41 and the bus-bars 42, are tuned to prevent the superposed high-frequency oscillations from reaching the bus-bars 42 and being affected by any operating conditions thereon, such as conditions resulting from switching operations. A balancing impedance 51 is connected in parallel with the high-frequency alternator 44 and may comprise either ohmic, inductive, or capacitative impedances. One output lead of the alternator 44 is connected to substantially the mid-point of the primary side of a differential transformer 52, the ends of which are respectively connected to the balancing impedance 51 and a conductor of the system 41.

Under normal operating conditions, the current from the alternator 44 will divide equally and flow in opposite directions in the primary of the differential transformer 52. The balancing of the current is obtained by varying the impedance 51 and, under balanced or normal operating conditions, substantially no voltage appears at the secondary winding of the transformer 52.

The secondary winding of the transformer 52 is connected to an electron rectifying and amplifying tube 53 through a blocking condenser 54.

The tube 53 is of the ordinary electron type, having a filament 56 heated by a source of energy 55, a plate 57 associated with a source 58, and a grid 59.

The rectified and amplified voltage-output of the tube is supplied to the coil 60 of the holding magnet 61. The holding magnet 61 maintains the interrupting means 43 in closed position, against the action of the spring 66, by the magnetic attraction on the armature 65 which is pivotally mounted at 64. A magnetizing coil 62 on the holding magnet, may be energized from a suitable source, such as a battery, through a choke coil 62, as indicated, and a choke coil 63 may be provided in circuit therewith.

In the event of a short-circuit on the system 41, the system short-circuit current will begin to develop, as heretofore explained, and the high-frequency current of the alternator 44 will also vary in the primary of the differential transformer 52 which will result in a high-frequency voltage on the secondary of the said transformer. This voltage is rectified and amplified by the electron tube 53, and a direct current is supplied to the demagnetizing coil 60. The coil 60 is so related to the coil 62 as to oppose the effect of the winding 62 to allow the spring 66 to open the circuit-interrupter 43. The choke coil 63 is placed in series relation with the magnetizing coil 62 to prevent any change of current flowing in the coil 62, and, at such times as the demagnetizing coil 60 is energized, the demagnetization of the holding magnet 61 is made more effective thereby.

It may thus be seen that I have provided a scheme utilizing a superposed high frequency which is operable to open a circuit-interrupter of a power system, in the event of a short-circuit condition, with a minimum amount of disconnect energy involved. In the event of short-circuit conditions, it is also possible to operate circuit-interrupting means before the system current has substantially changed from its normal operating value.

I do not wish my invention to be limited to the schemes shown and described herein, since one skilled in the art may modify the inventive concept of my invention without departing from the spirit and scope thereof.

I claim as my invention:

1. In a transmission system having a circuit-interrupter therein, the combination with controlling means for said interrupter, of a high-frequency alternator for continuously superposing a current on said system, rectifying means, transforming means so associated with said alternator and rectifying means that a high-frequency voltage is applied to said rectifying means only upon the occurrence of a short-circuit on said system, and means for electrically connecting the output of said rectifying means to said interrupter-controlling means.

2. In a transmission system having a circuit-interrupter therein, the combination with controlling means for said interrupter, of means for continuously impressing a high-frequency current on said system, including means energized in accordance with said high-frequency current and balanced under normal conditions on said system, and means energized substantially only upon the occurrence of an unbalance of said means for supplying a rectified current to said controlling means.

3. In a transmission system having a circuit-interrupter therein, the combination with controlling means for said circuit-interrupter, of means for impressing a high-frequency current on said system, including an alternator and a differential transformer having the mid-point of the primary thereof connected to one terminal of said alternator, an amplifying device operatively associated with the secondary of said transformer and the output of said amplifying device electrically connected to said circuit-interrupter controlling means.

4. The combination with a circuit-interrupting means for a power system, of a high-frequency current source for superposing a current on said system, a differentially-connected transforming means electrically associated with said source, the normal output voltage of said transforming means being substantially zero, and a rectifying and amplifying means interposed between said transforming means and said circuit-interrupting means for effecting the energization of said circuit-interrupting means substantially at the instant of the occurrence of a short-circuit on said system.

5. In an alternating-current system having a circuit interrupter therein and electromagnetic means for controlling the operation of said interrupter, the combination with a source of high-frequency electromotive force and means for impressing it upon said system, including a transformer having an intermediate point on the primary thereof connected to one terminal of said source and one end of said primary connected to the other terminal of said source through a reactance, and means for energizing said interrupter-controlling means in accordance with the energization of the secondary of said transformer.

In testimony whereof, I have hereunto subscribed my name this 18th day of October, 1929.

REINHOLD RÜDENBERG.